(12) United States Patent
Shin

(10) Patent No.: US 11,711,795 B2
(45) Date of Patent: Jul. 25, 2023

(54) APPARATUS AND METHOD FOR ALTRUISTIC SCHEDULING BASED ON REINFORCEMENT LEARNING

(71) Applicant: ELECTRONICS AND TELECOMMUNICATIONS RESEARCH INSTITUTE, Daejeon (KR)

(72) Inventor: Seung Jae Shin, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 368 days.

(21) Appl. No.: 17/104,377

(22) Filed: Nov. 25, 2020

(65) Prior Publication Data
US 2021/0168827 A1 Jun. 3, 2021

(30) Foreign Application Priority Data
Nov. 28, 2019 (KR) .......................... 10-2019-0155810

(51) Int. Cl.
*H04W 72/12* (2023.01)
*G06Q 10/0631* (2023.01)
(Continued)

(52) U.S. Cl.
CPC .......... *H04W 72/12* (2013.01); *G06F 9/4881* (2013.01); *G06Q 10/063116* (2013.01); *H04L 41/0823* (2013.01)

(58) Field of Classification Search
None
See application file for complete search history.

(56) References Cited

U.S. PATENT DOCUMENTS 8,315,239 B2 * 11/2012 Kim ...................... H04W 72/04
370/343
8,909,567 B2 12/2014 Kang et al.
(Continued)

FOREIGN PATENT DOCUMENTS

JP 2019-106120 A 6/2019
JP 2019194914 11/2019
(Continued)

OTHER PUBLICATIONS

Wang et al "Multi-Resource Fair Allocation in Heterogeneous Cloud Computing Systems", 2014 IEEE, pp. 2822-2835.*
(Continued)

*Primary Examiner* — Van H Nguyen
(74) *Attorney, Agent, or Firm* — Kile Park Reed & Houtteman PLLC

(57) ABSTRACT

The present disclosure relates to an apparatus and method of altruistic scheduling based on reinforcement learning. An altruistic scheduling apparatus according to an embodiment of the present disclosure includes: an external scheduling agent for determining a basic resource share for each process based on information of a resource management system; an internal scheduling agent for determining a basic resource allocation schedule for each process based on information including the basic resource share and a resource leftover based on the basic resource allocation schedule; and a leftover scheduling agent for determining a leftover resource allocation schedule based on information including the resource leftover. According to an embodiment of the present disclosure, it may be expected that reinforcement learning will not only mitigate the diminution of fairness of an altruistic scheduler but also further improve other performance indicators such as completion time and efficiency.

6 Claims, 8 Drawing Sheets

(51) Int. Cl.
   *H04L 41/0823*   (2022.01)
   *G06F 9/48*   (2006.01)

(56) References Cited

U.S. PATENT DOCUMENTS

| | | | | |
|---|---|---|---|---|
| 9,008,003 | B2* | 4/2015 | Lu | H04W 72/53 |
| | | | | 455/450 |
| 9,100,148 | B2 | 8/2015 | Cho et al. | |
| 9,106,591 | B2* | 8/2015 | Klots | H04L 43/08 |
| 9,256,471 | B2 | 2/2016 | Kim et al. | |
| 10,085,263 | B2* | 9/2018 | Choi | H04W 72/0453 |
| 10,425,956 | B2* | 9/2019 | Callard | H04W 72/12 |
| 2015/0282188 | A1 | 10/2015 | Stanze et al. | |
| 2015/0378753 | A1 | 12/2015 | Phillips et al. | |
| 2017/0235615 | A1 | 8/2017 | Venkataraja et al. | |

FOREIGN PATENT DOCUMENTS

| | | |
|---|---|---|
| KR | 1020140077769 | 6/2014 |
| KR | 1020160102917 | 8/2016 |
| KR | 10-2017-0032360 A | 3/2017 |
| KR | 10-2019-0070659 A | 6/2019 |
| KR | 1020190070251 | 6/2019 |
| KR | 10-2019-0106488 | 9/2019 |

OTHER PUBLICATIONS

Wong et al "Multi-Resource Allocation: Fairness-Efficiency Tradeoffs in a Unifying Framework", 2012 IEEE, 9 pages.*

Robert Grandl et al., "Altruistic Scheduling in Multi-Resource Clusters", Proceedings of the 12th USENIX Symposium on Operating Systems Design and Implementation (OSDI '16), Nov. 2-4, 2016, pp. 64-80.

Hongzi Mao et al., "Learning Scheduling Algorithms for Data Processing Clusters", MIT Compurter Science and Artificial Intelligence Laboratory, arXiv:1810.01963v3 [cs.LG] Feb. 26, 2019, pp. 1-19.

Honzi Mao et al., "Resource Management with Deep Reinforcement Learning", HotNets-XV, Nov. 9-10, 2016, pp. 50-56.

* cited by examiner

First process

Second process

APPARATUS AND METHOD FOR ALTRUISTIC SCHEDULING BASED ON REINFORCEMENT LEARNING

CROSS REFERENCE TO RELATED APPLICATION

The present application claims priority to Korean Provisional Application No. 10-2019-0155810, filed Nov. 28, 2019, the entire contents of which are incorporated herein for all purposes by this reference.

BACKGROUND OF THE INVENTION

Field of the Invention

The present disclosure relates to an apparatus and method of altruistic scheduling based on reinforcement learning. In addition, the present disclosure relates to an apparatus and method for constructing and utilizing an altruistic scheduling algorithm used in a resource management system in a reinforcement learning way for improving the decline of fairness.

Description of the Related Art

For a system in which limited resources are to be efficiently managed and used, a scheduling method is an operation method that aims at improving the system performance by appropriately allocating the resources in view of the amounts of resources demanded by various processes, the waiting time of each process and the priority order of processes. Representative scheduling methods include the First-in First-out (FIFO) method for processing the earliest requested process before any other processes, the Shortest Job First (SJF) method for executing a process with the shortest execution time, and the round-robin (RR) algorithm that allocates resources in units of time in turn without assuming any priority order among processes.

As each scheduling algorithm has a different criterion and a different method of allocating resources, the qualities of scheduling algorithms need to be evaluated by various criteria. Representative performance indicators for determining the quality of a scheduling algorithm are fairness, completion time and efficiency.

Fairness: A better scheduling algorithm provides a plurality of processes with a more equal opportunity for using resources.

Completion time: A better scheduling algorithm requires a shorter time to complete execution after the onset of a process.

Efficiency: A better scheduling algorithm processes a larger number of processes in a unit time.

However, as the indicators have a trade-off relationship with each other, one particular indicator may be kept at a high level at the cost of decrease of the other indicators. For example, the Dominant Resource Fairness (DRF) algorithm has excellent fairness but shows inferior performance to the Shortest Remaining Time First (SRTF) algorithm with respect to completion time and to the TETRIS algorithm with respect to efficiency.

In a real-life system requiring resource management, an actual request of process may be dynamically generated. As different performance indicators may be emphasized according to the features of processes that are requested in such a real-time environment, a single scheduling method can hardly satisfy every process and thus a scheduling methodology for keeping performance indicators at a good level is needed.

SUMMARY

The present invention provides a method and apparatus for altruistic scheduling based on reinforcement learning.

According to the present invention, an apparatus for altruistic scheduling based on reinforcement learning may comprise an external scheduling agent for determining a basic resource share for each process based on information of a resource management system, an internal scheduling agent for determining a basic resource allocation schedule for each process based on information comprising the basic resource share and a resource leftover based on the basic resource allocation schedule and a leftover scheduling agent for determining a leftover resource allocation schedule based on information comprising the resource leftover in an one embodiment.

According to the present invention, a method for altruistic scheduling based on reinforcement learning may comprise a first process for determining, by using the external scheduling agent, a basic resource share for each process based on information of a resource management system, a second process for determining, by using the internal scheduling agent, a basic resource allocation schedule for each process based on information comprising the basic resource share and a resource leftover based on the basic resource allocation schedule; and a third process for determining, by using the leftover scheduling agent, a leftover resource allocation schedule based on information comprising the resource leftover in an one embodiment.

According to the present invention, a computer program, which is stored in a non-transitory computer-readable storage medium in a computer, for altruistic scheduling method based on reinforcement learning using external, internal and leftover scheduling agents, the computer program may implement determining by using the external scheduling agent, a basic resource share for each process based on information of a resource management system, determining, by using the internal scheduling agent, a basic resource allocation schedule for each process based on information comprising the basic resource share and a resource leftover based on the basic resource allocation schedule and determining, by using the leftover scheduling agent, a leftover resource allocation schedule based on information comprising the resource leftover.

DETAILED DESCRIPTION OF THE INVENTION

Figure 1A:
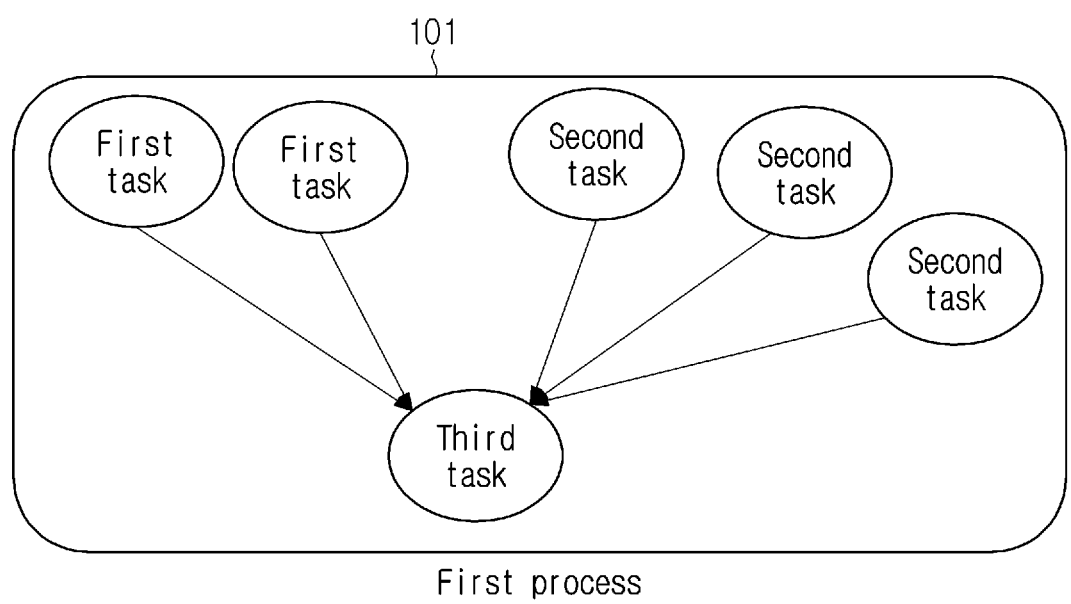
FIG. 1A and FIG. 1B illustrate an altruistic scheduling method.
Figure 1A:
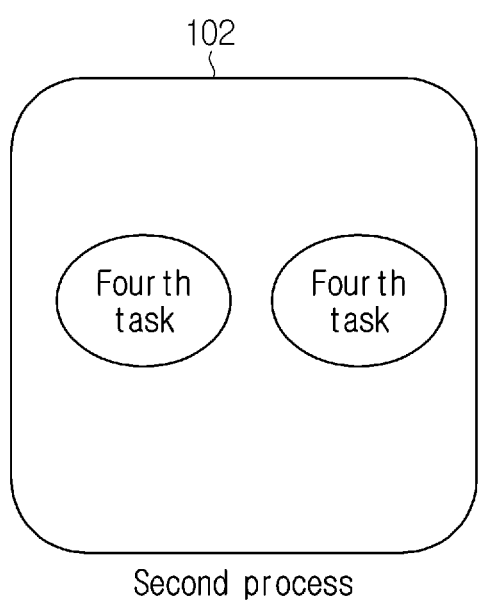

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present invention. Also, embodiments that include other components in addition to the components described in the various embodiments are also included in the scope of the present disclosure.

Hereinafter, embodiments of the present disclosure will be described with reference to the accompanying drawings.

Altruistic scheduling is a scheduling methodology that lets each process altruistically share an allocated resource, as long as fairness is not significantly degraded, and diminishes the degradation of completion time and efficiency, thereby keeping performance indicators contradicting each other at a good level.

FIG. 1 illustrates an altruistic scheduling method. More particularly, FIG. 1A exemplifies processes existing in a system requiring resource management to which the altruistic scheduling technique is to be applied. FIG. 1B illustrates different methods of distributing resources for comparison between fairness scheduling and altruistic scheduling.

As one embodiment, FIG. 1A illustrates tasks constituting each process in directed acyclic graphs (DAGs), when it is assumed that there are only a first process 101 and a second process 102 in a system. The first process 101 consists of two first tasks, three second tasks and one third task. Herein, the third task may be executed after all the first tasks and the second tasks are completed. The second process 102 consists of two fourth tasks.

Herein, the following task information is assumed.

| Task Type | Resource Usage | Execute time (time-unit) |
|---|---|---|
| 1 | 8 | 0.5 |
| 2 | 21 | 1 |
| 3 | 10 | 0.1 |
| 4 | 29 | 1 |

Resource usage means an amount of resource necessary for completing a specific task, and execute time means a time required for a specific task to be completed. According to the table above, in order to complete the first task, the resource needs to be used as much as 8 and the required execute time (time-unit) is 0.5. The second task requires the resource usage of 21 and the execute time of 1 time-unit. The third task requires the resource usage of 10 and the execute time of 0.1 time-unit. The fourth task requires the resource usage of 29 and the execute time of 1 time-unit.

Figure 1B:
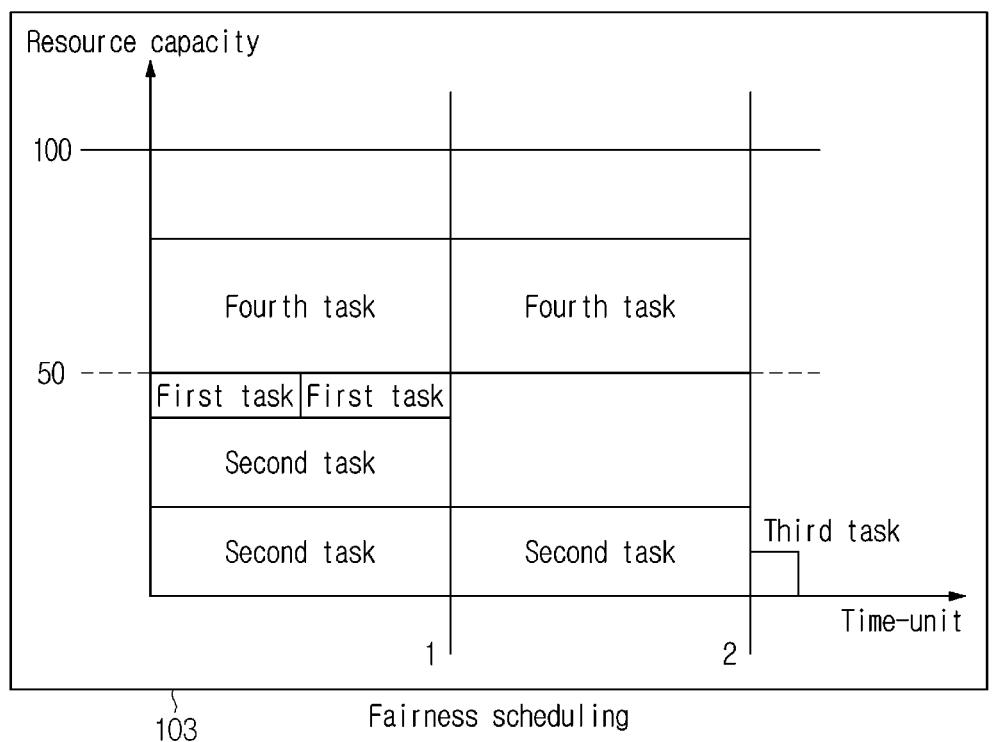
Figure 1B:
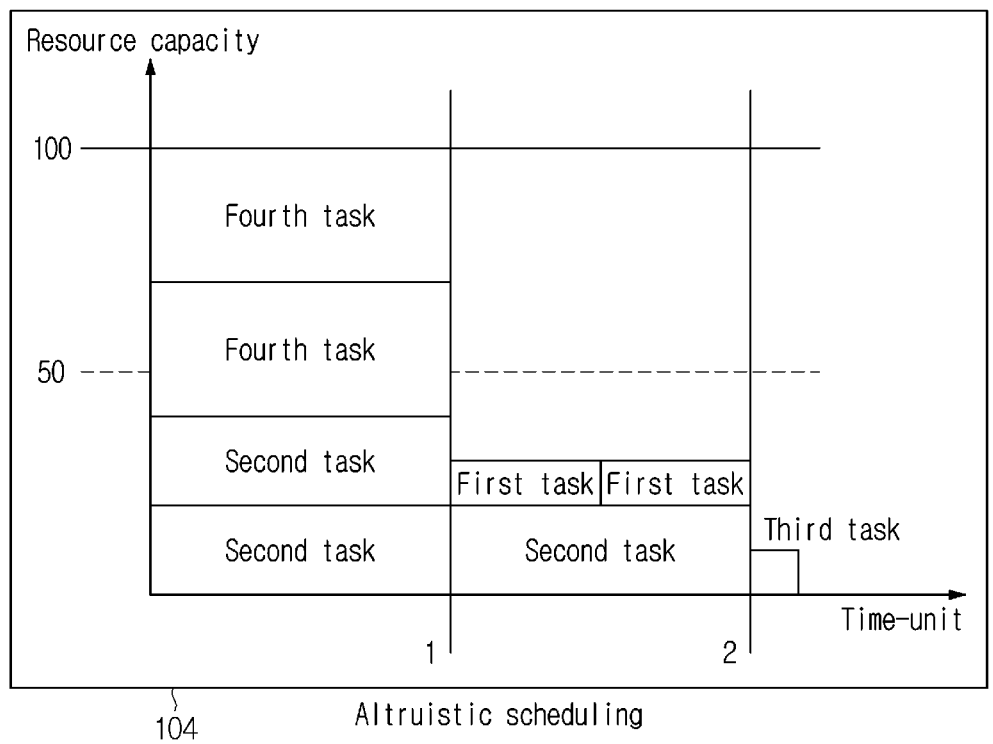

As one embodiment, FIG. 1B assumes that there is only one arbitrary resource pool with capacity of 100. FIG. 1B shows an example in which altruistic scheduling may reduce an average completion time while maintaining the fairness of resource distribution among processes in a clustered computing system. Fairness scheduling 103, which considers only fairness among performance indicators, divides the resource pool into 50:50, allocates each portion to each process and attempts bin-packing within the range. As a result, the first process is completed in 2.1 time-units and the second process is completed in 2 time-units. Thus, the average completion time is 2.05 time-units.

On the other hand, although the first tasks of the first process are delayed 1 time-unit to be processed, the time for executing the first process does not increase. Accordingly, altruistic scheduling 104 may consider a portion of the resource allocated to the first process as a leftover and share the portion with the other process, that is, the second process. As a result, the second process is allocated the additional shared resource of 8, thereby processing the fourth tasks simultaneously. Thus, the time for executing the second process may be reduced to 1 time-unit. Herein, like in the fairness scheduling 103, the first process is completed in 2.1 time-units. Consequentially, the average completion time may be improved to 1.55 without degrading the completion time of the first process, that is, without diminishing the effective fairness.

According to the altruistic scheduling 104, in a batch processing (offline) environment where a set of process requests is given at once, the altruistic scheduling does not diminish effective fairness. On the other hand, in the case of a real-time (online) environment where a process request is dynamically generated, since an input process and task information of the process are not known beforehand, uncertainty diminishes fairness. According to the altruistic scheduling 104, when Carbyne, a heuristic altruistic scheduling algorithm, is tested in a real-time environment, about 4% of the processes may increase their completion time by from about 12% up to about 62%.

As one of the recent trends is the increase in utilizing cloud computing, the fairness of a scheduler is an important performance indicator necessary for rendering the virtualization and isolation of resources. Accordingly, in order to improve the practicality of altruistic scheduling, it is important to improve and minimize the diminution of effective fairness in a dynamic real-time environment while keeping a balance among performance indicators. Accordingly, in order to improve the diminution of effective fairness in a dynamic real-time environment, altruistic scheduling based on reinforcement learning will be described in further detail with reference to FIGS. 2 to 5.

Figure 2:
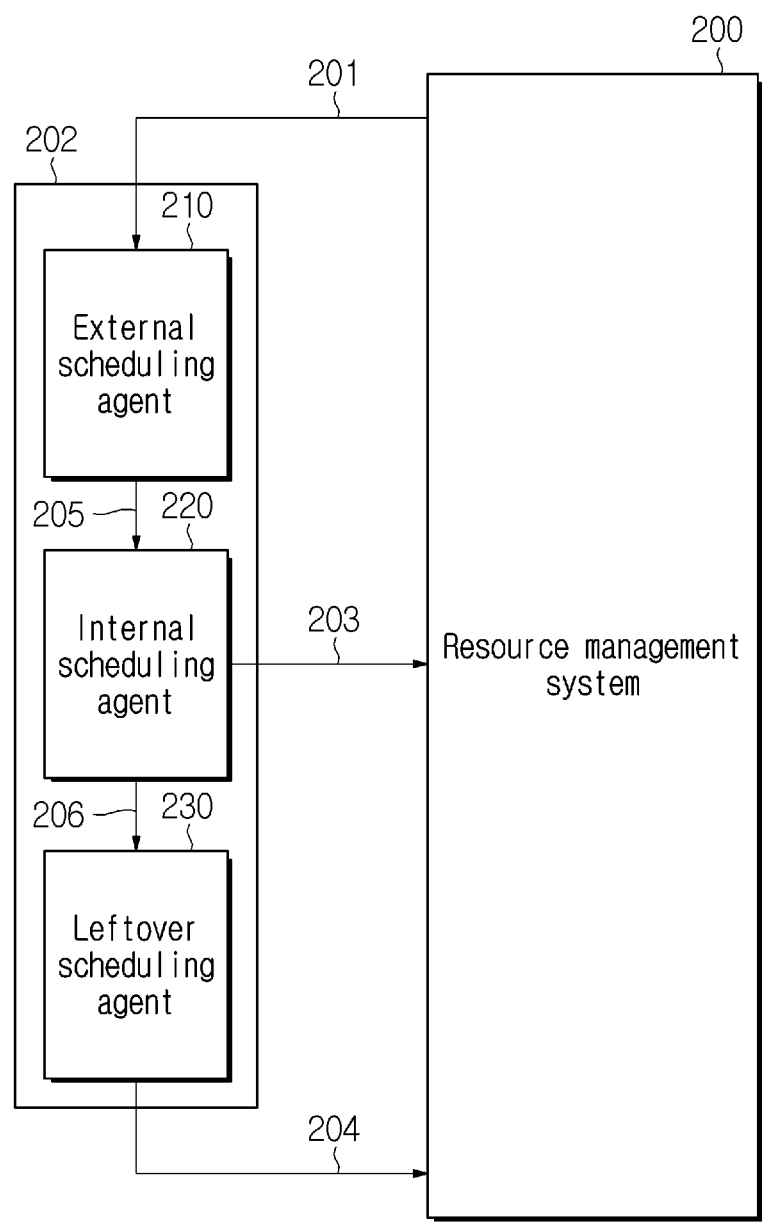
FIG. 2 illustrates an altruistic scheduling system based on reinforcement learning according to an embodiment of the present disclosure.

FIG. 2 illustrates an altruistic scheduling system based on reinforcement learning according to an embodiment of the present disclosure. More particularly, an altruistic scheduling apparatus 202 based on reinforcement learning may include: an external scheduling agent 210 for determining a basic resource share for each process based on information of a resource management system; an internal scheduling agent 220 for determining a basic resource allocation schedule for each process based on information including the basic resource share and a resource leftover based on the basic resource allocation schedule; and, a leftover scheduling agent 230 for determining a leftover resource allocation schedule based on information including the resource leftover. A resource management schedule determined through the agents may be applied to a resource management system 200.

The resource management system 200 is an agent that executes a requested process and tasks by using a possessed resource. An operating system, a distributed computing system or a work management system of factory may be examples to which the present disclosure is not limited though.

It may be assumed that the resource management system 200 has a plurality of resource pool types and a plurality of resource pools. For example, the resource of a computing system equipped with 24 central processing unit (CPU) cores, 2 64 GB memories and 1 10 TB storage may be expressed as (24, 64, 64, 10).

Each scheduling agent is a control or decision object capable of reinforcement learning and includes a policy and value functions. A policy and a value function may be implemented by a general data structure (e.g., map, table, etc.) or a machine learning model (e.g., FCN, CNN, RNN, etc.). Their number and details are not limited to a specific method and may be freely increased/decreased or adjusted as needed. Each scheduling agent is not limited to a specific reinforcement learning method (e.g., DQN, A3C, PPO). When necessary, a plurality of reinforcement learning methods may be used. For example, when an asynchronous method or a multi-agent concept is applied in a reinforcement learning process, a plurality of agents or resource management system objects may be generated. Encoding of data that are exchanged between an agent and a resource management system may be expressed in a digitized structure (e.g., sequence, matrix, vector and other structures), as needed, or be expressed in a human-readable string (e.g., JSON, XML).

According to an embodiment of the present disclosure, the external scheduling agent 210 may be an agent that receives information 201 of the resource management system 200 and determines a basic resource share by considering fairness. The term "external" means the outside of process (inter-process).

The information 201 may include: a set of processes that are newly requested to the resource management system 200, a set of processes that are waiting for scheduling, a request time of each process, an execution sequence of tasks constituting each process (101 and 102 of FIG. 1A), a status of process request including the resource usage and execute time of each task, information on which portion of which resource pool is allocated to which task and when it was allocated, and a status of resource usage including the condensed version of the preceding information. However, the present disclosure is not limited to what is described herein. Furthermore, in the above information, the resource usage and execute time of each task may be an average value, a median value, a maximum/minimum value, a variance and other statistically significant values that are obtained by analyzing the history of past executions.

The external scheduling agent 210 may determine a basic resource share for each process of the system 200 by using the information 201. Since a resource is allocated with consideration for fairness, the resource needs to be equally allocated among processes in principle like in the fairness scheduling 103 of FIG. 1B. However, the purpose of the agent 210 may be to determine a most efficient basic resource share as long as fairness is not significantly diminished through a learning process described below. The learning process for this purpose will be described in detail with reference to FIGS. 3A, 3B and 3C.

Accordingly, a basic resource share output by the external scheduling agent 210 may include information on at what time, which resource and how much will be allocated to which process, to which the present disclosure is not limited.

The number of cases for the basic resource share is determined based on the number of resource pools, the number of processes and the length of time to be scheduled. For example, when there are 3 resource pools, 5 processes and 5 time-units to be scheduled, the number of cases is 75 (=3*5*5).

The external scheduling agent 210 delivers information 205 including the basic resource share to the internal scheduling agent 220. Herein, the information 205 including the basic resource share may also include information 201 on the resource management system but is not limited thereto.

In one embodiment, compared to the fairness scheduling (103 of FIG. 1B) for each process, the internal scheduling agent 220 may take charge of determining a basic resource allocation schedule and a resource leftover reflecting the basic resource allocation schedule for maximizing efficiency and the resource leftover, as long as a completion time of process is not increased, that is, as long as effective fairness is not diminished. The term "internal" means the inside of process (intra-process).

The internal scheduling agent 220 outputs a basic resource allocation schedule and a resource leftover of each process by using the information 205 including the basic resource share.

As the basic resource allocation schedule is information determined by the external scheduling agent 210 for each process within a range of basic resource share, the basic resource allocation schedule includes information on which portion of which resource pool is allocated to which task of which process and when it is allocated. The basic resource allocation schedule is scheduling determination and thus may be directly delivered to the resource management system 200.

The resource leftover is information on how much of each resource allocated as a basic resource, when and for which process may be shared as a leftover. For example, the information may be expressed as a sum of resource leftovers per time unit or in each resource pool.

The internal scheduling agent 220 delivers information 206 including the basic resource allocation schedule and the resource leftover to the leftover scheduling agent 230. In one embodiment, the information 206 may further include the request status and resource usage status of each process. Herein, the request status of each process may be updated by reflecting a result of a basic resource allocation schedule in the request status of each process that was included in the information 201 of the resource management system, and the resource usage status may also be updated by reflecting a result of a basic resource allocation schedule in the resource usage status that was included in the information 201 of the resource management system.

The internal scheduling agent 220 may also determine an efficient basic resource allocation schedule and a resource leftover through a learning process that will be described below. The learning process will be described in detail with reference to FIGS. 3A, 3B and 3C.

In one embodiment, a basic resource allocation schedule of internal tasks of each process and a resource leftover of each process may be determined by the internal scheduling agent 220. Accordingly, when a plurality of processes is input with a single piece of process information, the implementation may be basically repeated as many as the number of processes. However, a type of batch processing may also be executed in which a plurality of processes is input simultaneously and a result is output at once. For example, when there are 10 processes to be scheduled, if the processes are implemented by an agent processing in a single process unit, the determination may be implemented in a structure of repetitive statement, that is, be repeated 10 times. On the other hand, when a type of batch processing is used for implementation, process-related information of input and output may be defined in a sequence or vector encompassing all the 10 processes and the determination may be executed only once.

The leftover scheduling agent 230 is an agent that determines a share of leftover resource by considering process completion time or efficiency among performance indicators. Using the information 206 including the basic resource allocation schedule and the resource leftover that is output by the internal scheduling agent 220, the leftover scheduling agent 230 may output the leftover resource allocation schedule 204 and deliver it to the resource management system 200.

The leftover resource allocation schedule 204 may include information on when and which portion of which resource pool is allocated to which task of which process. The leftover resource allocation schedule 204 is determined for a not yet allocated task and leftover resources, while the basic resource allocation schedule of the internal scheduling agent 220 is determined.

The leftover scheduling agent 230 may also determine an efficient leftover resource allocation schedule through a learning process that will be described below. The learning process will be described in detail with reference to FIGS. 3A, 3B and 3C.

The resource management system 200 may mitigate the diminution of fairness and further improve other performance indicators like process completion time and efficiency in accordance with the basic resource allocation schedule 203 and the leftover resource allocation schedule 204 that are generated by an altruistic scheduling apparatus based on reinforcement learning according to an embodiment of the present disclosure.

Figure 3A:
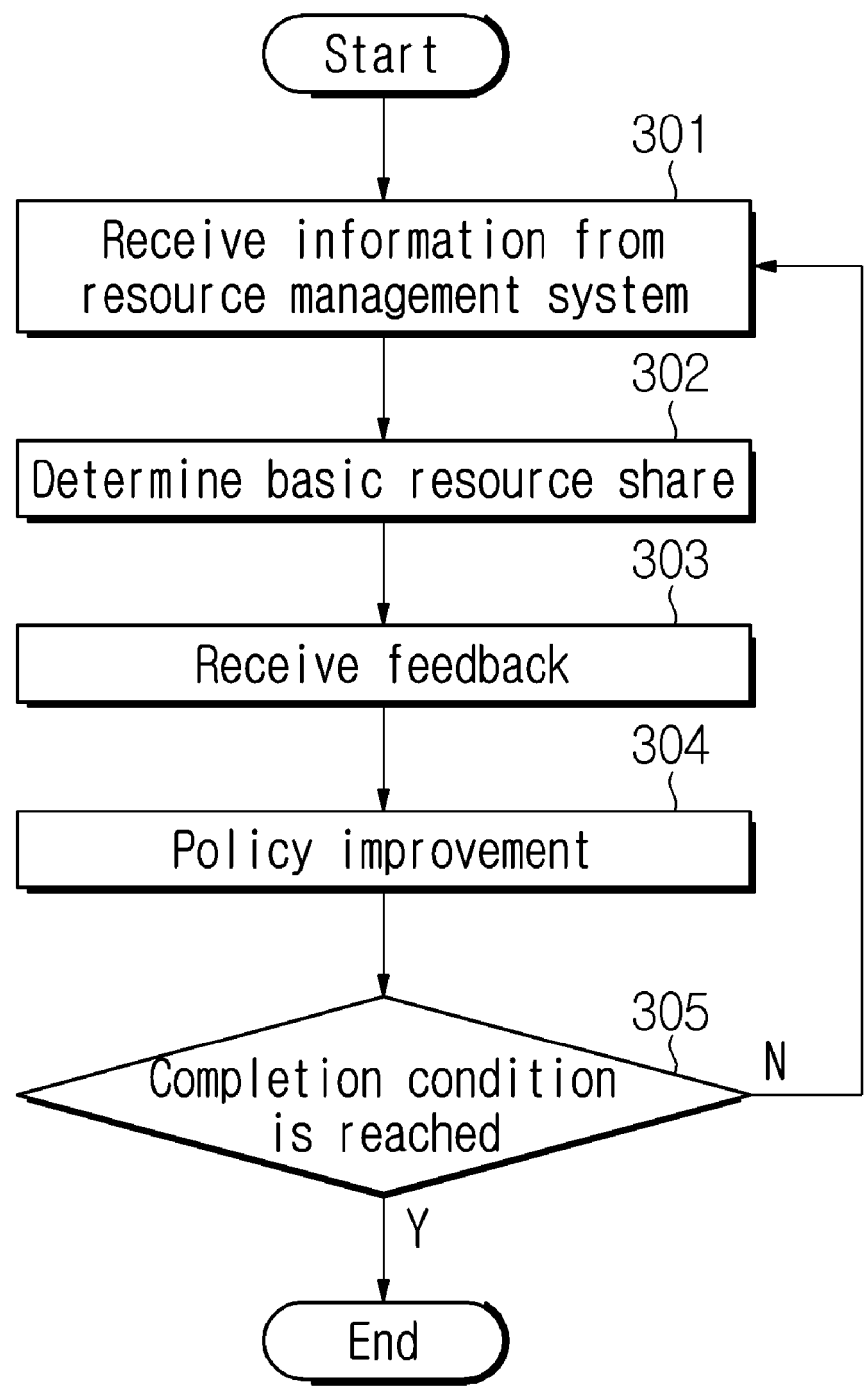
FIGS. 3A, 3B and FIG. 3C illustrate a learning process of an altruistic scheduling apparatus based on reinforcement learning according to an embodiment of the present disclosure.
Figure 3B:
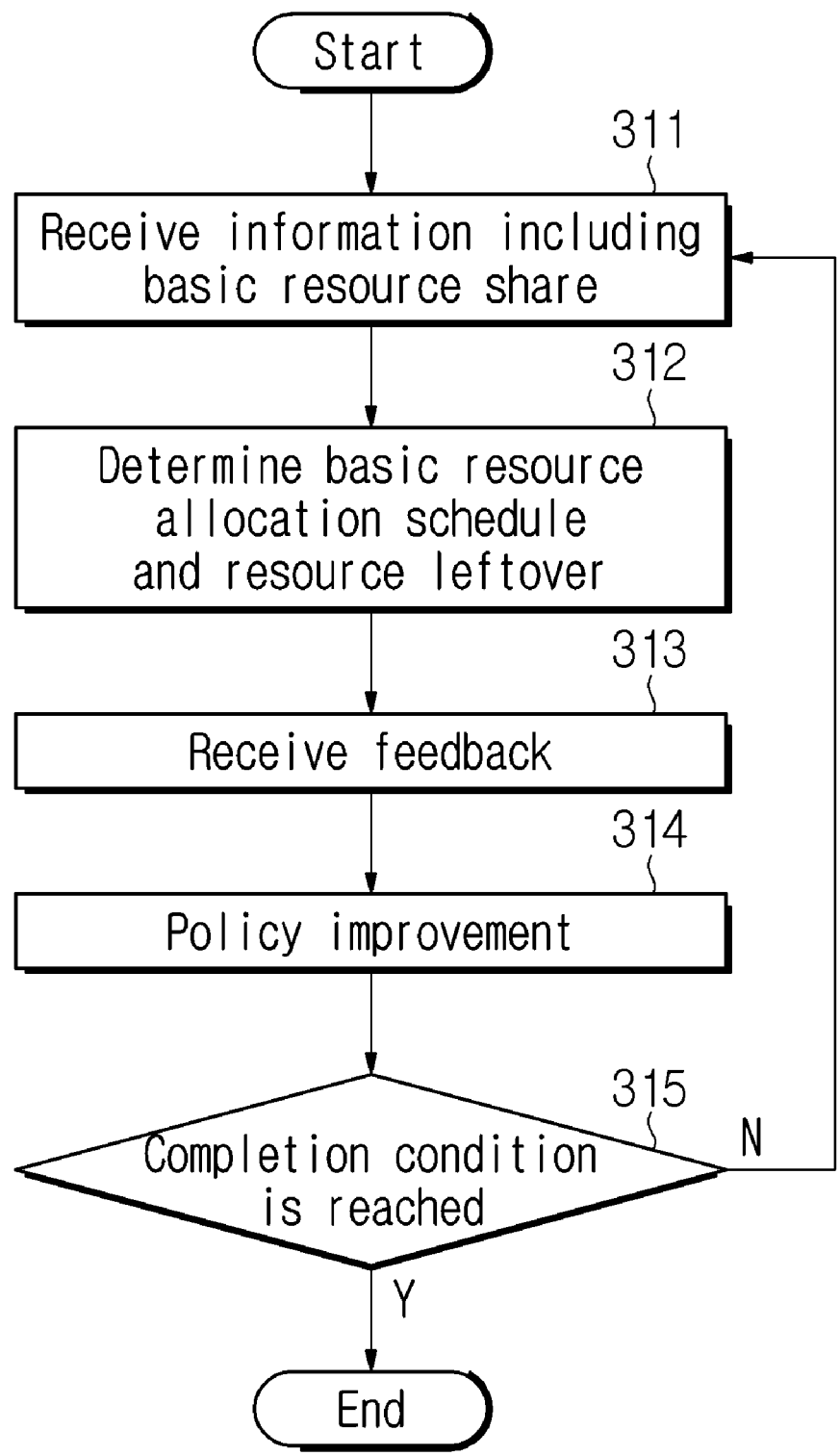
Figure 3C:
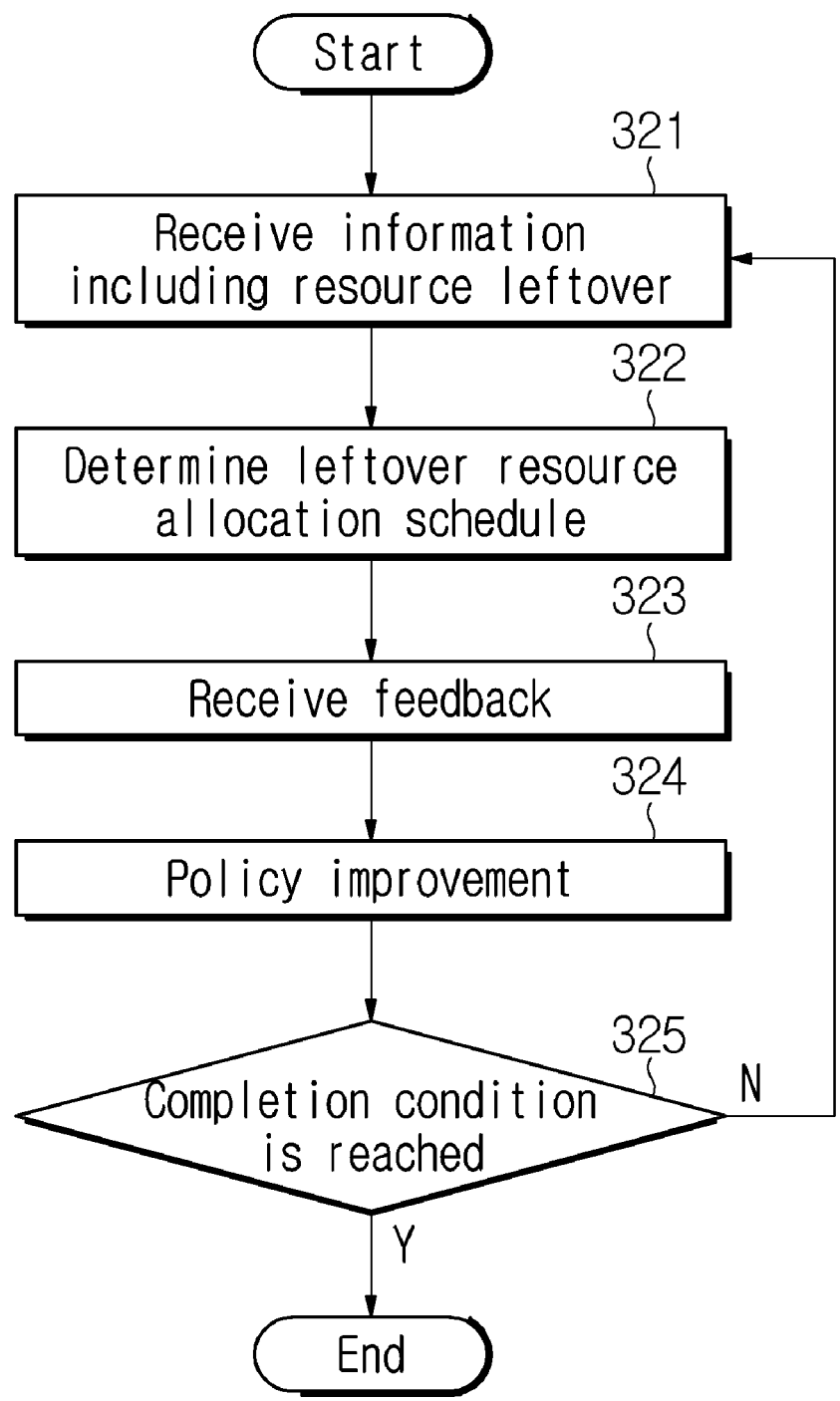

FIGS. 3A, 3B and 3C illustrate a learning process of an altruistic scheduling apparatus based on reinforcement learning according to an embodiment of the present disclosure. More particularly, FIG. 3A is a flowchart showing a learning process of an external scheduling agent, FIG. 3B is a flowchart showing a learning process of an internal scheduling agent, and FIG. 3C is a flowchart showing a learning process of a leftover scheduling agent.

The learning processes of the external, internal and leftover scheduling agents, which are described with reference to FIGS. 3A, 3B and 3C, repeat learning steps in the following form "Receive—Determine—Feedback (reward)—Policy improvement—Receive— . . . " for an actual system or an environment (e.g., test bed or simulation) modeling the system. Learning may be repeated until a completion condition is reached, and should be performed to maximize a sum of cumulative rewards to be obtained in the future. Accordingly, learning is performed to evolve a policy and a value function of an agent. The completion condition may be used with the following criteria: time, performance indicator, learning level, whether or not an important cumulative value has formed at a high level and whether or not it is possible to expect a stable output that does not oscillate significantly. The completion condition is not limited to a specific condition. A scheduling algorithm may be automatically configured in such a way that a resource management system is considered as an environment and the external, internal and leftover scheduling agents are improved while repeating each learning step.

First, the learning process of the external scheduling agent may be implemented in the following order. In one embodiment, the external scheduling agent receives (301) information of a resource management system including a process request status and a resource usage status from the resource management system and determines (302) and outputs a basic resource share of each process based on an internal policy function or value function. In addition, the external scheduling agent may receive (303) fairness evaluation feedback from the resource management system as a reward function for reinforcement learning and perform (304) policy improvement by using the feedback as a reward function. Next, the external scheduling agent determines (305) whether or not a completion condition is reached. When the completion condition is reached, the learning process is completed. When it is determined that the completion condition is not reached yet, the external scheduling agent returns to the step of receiving (301) information of the resource management system and repetitively performs the above-described process "Receive—Determine—Feedback (reward)—Policy improvement".

The learning process of the internal scheduling agent is implemented as follows. The internal scheduling agent receives (311) information including the basic resource share determined by the external scheduling agent, determines (312) a basic resource allocation schedule for tasks constituting each process based on an internal policy function or value function, and also determines (312) a resource leftover, which may be altruistically shared in each process, based on the determined basic resource allocation schedule. This process is implemented within the limit of a basic resource share that is determined for each process. The determined basic resource allocation schedule is delivered to the resource management system and may be reflected in the scheduling of the system. Accordingly, the internal scheduling agent receives (313) evaluation feedback for fairness, completion time and efficiency from the resource management system and performs (314) policy improvement by using the feedback as a reward function. Next, the internal scheduling agent determines (315) whether or not a completion condition is reached. When the completion condition is reached, the learning process is completed. When it is determined that the completion condition is not reached yet, the internal scheduling agent returns to the step of receiving (311) information including a basic resource share and repetitively performs the above-described process "Receive—Determine—Feedback (reward)—Policy improvement".

For learning, the leftover scheduling agent may receive (321) information including a resource leftover of each process of the internal scheduling agent. The information may include an updated process request status and an updated resource usage status. This means that a change by the basic resource allocation schedule is reflected in the process request status and the resource usage status.

The leftover scheduling agent determines (322) a leftover resource allocation schedule by using an internal policy function or a value function. Thus, additional allocation may be made to a task that has not received a resource share yet, with consideration of completion time and efficiency. In addition, the determined leftover resource allocation schedule is delivered to the resource management system and is reflected in the scheduling of the system. Accordingly, the leftover scheduling agent receives (323) evaluation feedback for completion time and efficiency from the resource management system and performs (324) policy improvement by using the feedback as a reward function. Next, the leftover scheduling agent determines (325) whether or not a completion condition is reached. When the completion condition is reached, the learning process is completed. When it is determined that the completion condition is not reached yet, the leftover scheduling agent returns to the step of receiving (321) information including a resource leftover and repetitively performs the above-described process "Receive—Determine—Feedback (reward)—Policy improvement".

Herein, performance indicator evaluation that each agent receives as feedback may be received, for example, after a basic resource allocation schedule is determined by the internal scheduling agent and the basic resource allocation schedule is reflected in the resource management system, or after not only the basic resource allocation schedule but also a left resource allocation schedule is determined by the leftover scheduling agent and all the determined schedules are reflected in the resource management system.

As described above, learning is performed to evolve a policy and a value function of an agent. This means finding a policy and a value function that maximize an expected sum of future rewards. Herein, depending on an expected result of learning and a desired learning direction, learning may be performed in such a way that a specific reward function is weighed against other reward functions. Each of the scheduling agents may accumulate a set or sequence of input observations, behaviors and reward functions in an internal storage space. This is referred to as experience. As experience is accumulated, when necessary, updating is performed for a policy and a value function. As the updating is repeated, the policy and the value function are so evolved as to improve the indicators of fairness, process completion time and efficiency. That is, automatic configuration may be made in such a way that a scheduling algorithm is gradually built into policies and value functions.

Figure 4:
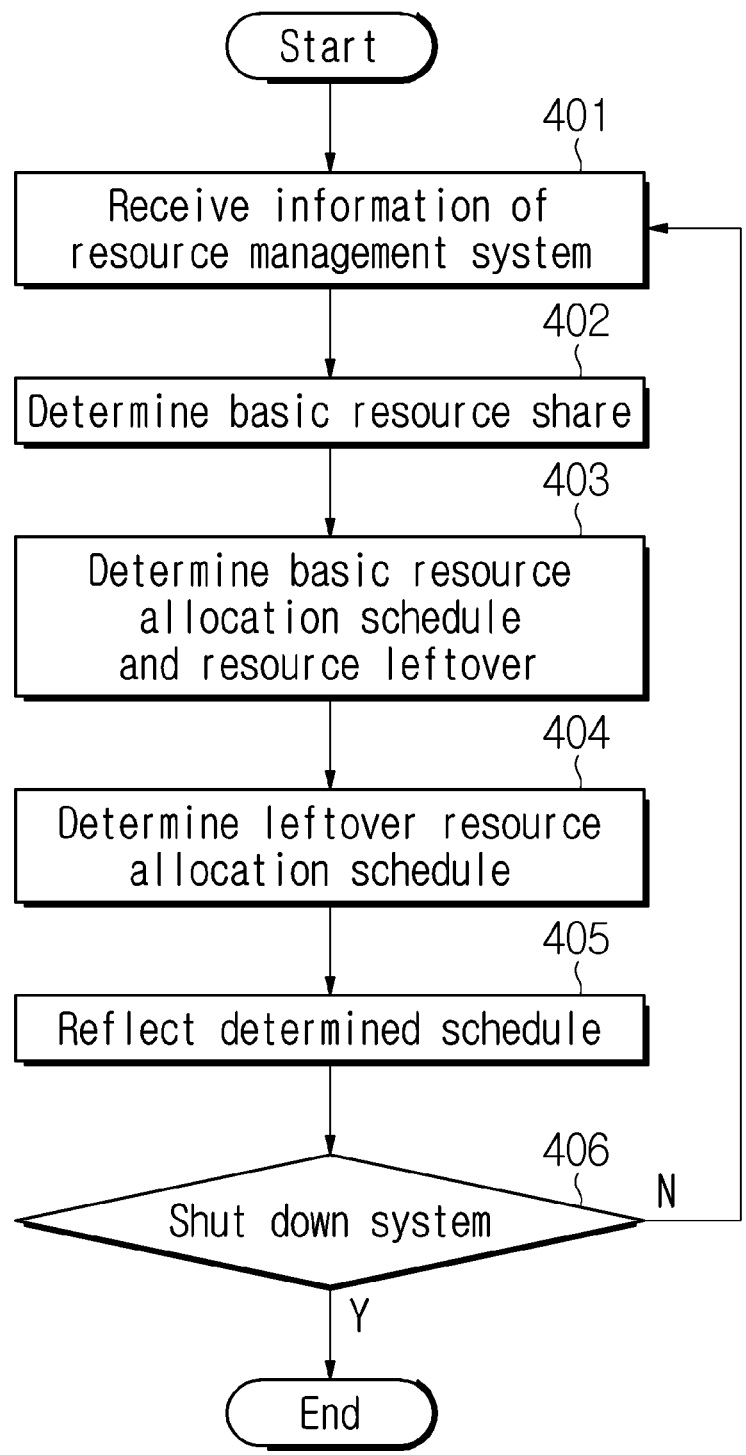
FIG. 4 illustrates a process of utilizing an altruistic scheduling system based on reinforcement learning according to an embodiment of the present disclosure.

FIG. 4 illustrates a process of utilizing an altruistic scheduling system based on reinforcement learning according to an embodiment of the present disclosure. More particularly, FIG. 4 is a flowchart describing a process of reflecting a scheduling algorithm, which is automatically configured through reinforcement learning, in a resource management system and utilizing the algorithm. In one embodiment, the reinforcement learning may be implemented as described in FIGS. 3A, 3B and 3C and be a process of utilizing the altruistic scheduling system based on reinforcement learning described in FIG. 2. In addition, the utilization process may be similar to excluding the steps of receiving reward information and performing reinforcement learning in each agent from the learning process.

In one embodiment, the altruistic scheduling apparatus based on reinforcement learning receives (401) information of a resource management system. Herein, as described in FIG. 2, the information of the resource management system may be information including a process request status and a resource usage status. Based on the information, a basic resource share for each process is determined (402) which includes information on at what time, which resource and how much will be allocated to which process. Based on information including the determined basic resource share, a basic resource allocation schedule may be determined for each process, and a resource leftover may be determined (403) based on the determined basic resource allocation schedule. Herein, as information that is determined within a range of the basic resource share, the basic resource allocation schedule may be information on when and which portion of which resource pool is allocated to which task of which process. The resource leftover may be information on how much of each resource allocated as a basic resource, when and for which process may be shared as a leftover.

Based on information including the basic resource allocation schedule and the resource leftover, a leftover resource allocation schedule is determined (404). The leftover resource allocation schedule may include information on when and which portion of which resource pool is allocated to which task of which process. The leftover resource allocation schedule may be determined for a not yet allocated task and leftover resources, while the basic resource allocation schedule is determined. The determined basic resource allocation schedule and the leftover resource allocation schedule may be reflected (405) in a resource management system. As illustrated in FIG. 4, the basic resource allocation schedule and the leftover resource allocation schedule may be reflected simultaneously in the resource management system after the leftover resource allocation schedule is determined. However, the basic resource allocation schedule, which is determined before the leftover resource allocation schedule, may be reflected in the resource management system, and then, the leftover resource allocation schedule may be delivered to and reflected in the resource management system. That is, the present disclosure is not limited to the above embodiment.

In one embodiment, the above flowchart may be implemented by using the resource management system and the altruistic scheduling apparatus based on reinforcement learning of FIG. 2. An external scheduling agent may receive (401) information of the resource management system and determine (402) a basic resource share for each process based on the information. Based on information including the determined basic resource share, an internal scheduling agent may determine a basic resource allocation schedule of each process and also determine (403) a resource leftover based on the determined basic resource allocation schedule. In addition, a leftover scheduling agent may determine (404) a leftover resource allocation schedule based on information including the basic resource allocation schedule and the resource leftover.

Figure 5:
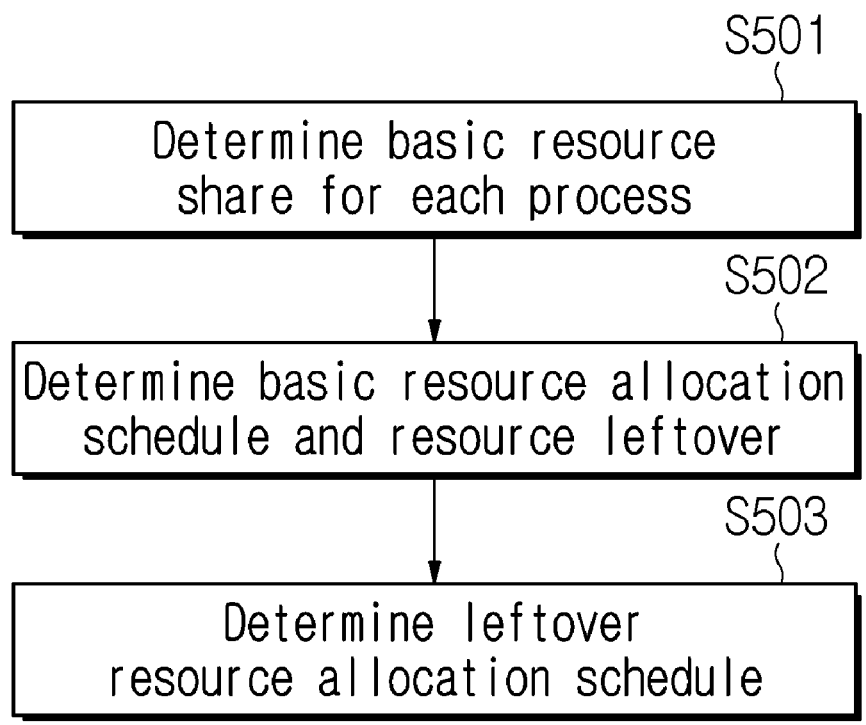
FIG. 5 illustrates an altruistic scheduling method based on reinforcement learning according to an embodiment of the present disclosure.

FIG. 5 illustrates an altruistic scheduling method based on reinforcement learning according to an embodiment of the present disclosure.

More particularly, FIG. 5 illustrates an altruistic scheduling method based on reinforcement learning using external, internal and leftover scheduling agents that will determine a plurality of schedules.

Using an external scheduling agent, based on the information of a resource management system, a basic resource share for each process is determined (S501) which includes information on at what time, which resource and how much will be allocated to which process.

Using an internal scheduling agent, based on information including the basic resource share and within a range of the basic resource share, a basic resource allocation schedule is determined which is information on when and which portion of which resource pool is allocated to which task of which process, and a resource leftover is determined based on the basic resource allocation schedule (S502). Herein, the resource leftover may be information on how much of each resource allocated as a basic resource, when and for which process may be shared as a leftover.

Next, using a leftover scheduling agent, an altruistic scheduling method based on reinforcement learning may be configured including the step S503 of determining a leftover resource allocation schedule based on information including the resource leftover. The leftover resource allocation schedule may include information on when and which portion of which resource pool is allocated to which task of which process. The leftover resource allocation schedule may be determined for a not yet allocated task and leftover resources, while the basic resource allocation schedule of the internal scheduling agent is determined.

In one embodiment, the reinforcement learning using the agents may be implemented as described above with reference to FIGS. 3A, 3B and 3C. The agents may be the same as the agents of FIG. 2. Information used by each agent for determination may be also the same as described above with reference to FIG. 2.

The various forms of the present disclosure are not an exhaustive list of all possible combinations, and are intended to describe representative aspects of the present disclosure, and the matters described in the various forms may be applied independently or in combination of two or more.

For example, according to an embodiment of the present disclosure, a computer program stored in a medium for altruistic scheduling based on reinforcement learning may be implemented in such a way that reinforcement learning is performed in another computing apparatus and only a scheduling agent completing reinforcement learning is used. However, the program may also be implemented in such a way that reinforcement learning is performed directly through a scheduling agent and then the scheduling agent completing the reinforcement learning is used. In addition, a computer that implements the computer program stored in the medium for altruistic scheduling based on reinforcement learning may include a mobile information terminal, a smart phone, a mobile electronic device, and a stationary type computer, to which the present disclosure is not limited.

In addition, various forms of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. It will be apparent to those skilled in the art that various substitutions, modifications and changes are possible are possible without departing from the technical features of the present disclosure. It is therefore to be understood that the scope of the present disclosure is not limited to the above-described embodiments and the accompanying drawings.

What is claimed is:

1. An altruistic scheduling apparatus based on reinforcement learning, the apparatus comprising:
   one or more processors;
   an external scheduling agent, executed by the one or more processors, for determining a basic resource share for each process based on information of a resource management system;
   an internal scheduling agent, executed by the one or more processors, for determining a basic resource allocation schedule for each process based on information comprising the basic resource share and a resource leftover based on the basic resource allocation schedule; and
   a leftover scheduling agent, executed by the one or more processors, for determining a leftover resource allocation schedule based on information comprising the resource leftover,
   wherein the internal scheduling agent performs learning by receiving feedback from the resource management system reflecting at least one of the basic resource allocation schedule and the leftover resource allocation schedule, and
   wherein the feedback comprises:
      fairness evaluation on whether or not an opportunity to use a resource is equally provided to processes, evaluation of completion time that is a required time from the onset of a process to the end of execution, and efficiency evaluation based on the number of processes that are processed per unit time,
   wherein the leftover scheduling agent performs learning by receiving feedback from the resource management system reflecting the basic resource allocation schedule or the leftover resource allocation schedule, and
   wherein the feedback comprises the evaluation of completion time and the efficiency evaluation,
   wherein the external scheduling agent performs learning by receiving feedback, and wherein the feedback comprises the fairness evaluation,
   wherein the basic resource share comprises, for each process, information on a type of resource to be allocated, resource allocation time and a resource share,
   wherein the basic resource allocation schedule comprises, for each task of each process, information on a type of resource to be allocated, resource allocation time and a resource share, and
   wherein the information of the resource management system comprises:
      a process request status comprising a set of newly requested processes and information associated with the newly requested processes; and
      a resource usage status that is information on a resource needed by each process.

2. The apparatus of claim 1, wherein the internal scheduling agent updates the resource usage status and the process request status by reflecting the basic resource allocation schedule in the resource usage status and the process request status respectively.

3. The apparatus of claim 2, wherein the updated resource usage status and the updated process request status are comprised in information comprising the resource leftover.

4. An altruistic scheduling method based on reinforcement learning using external, internal and leftover scheduling agents, the method comprising:
   determining, by using the external scheduling agent, a basic resource share for each process based on information of a resource management system;
   determining, by using the internal scheduling agent, a basic resource allocation schedule for each process based on information comprising the basic resource share and a resource leftover based on the basic resource allocation schedule; and determining, by using the leftover scheduling agent, a leftover resource allocation schedule based on information comprising the resource leftover, wherein reinforcement learning using the internal scheduling agent is performed by receiving feedback from the resource management system reflecting the basic resource allocation system or the leftover resource allocation schedule, and wherein the feedback comprises:

fairness evaluation on whether or not an opportunity to use a resource is equally provided to processes, evaluation of completion time that is a required time from the onset of a process to the end of execution, and efficiency evaluation based on the number of processes that are processed per unit time, wherein reinforcement learning using the leftover scheduling agent is performed by receiving feedback from the resource management system reflecting the basic resource allocation schedule or the leftover resource allocation schedule, and wherein the feedback comprises the evaluation of completion time and the efficiency evaluation, wherein reinforcement learning using the external scheduling agent is performed by receiving feedback, and wherein the feedback comprises the fairness evaluation, wherein the basic resource share comprises, for each process, information on a type of resource to be allocated, resource allocation time and a resource share, wherein the basic resource allocation schedule comprises, for each task of each process, information on a type of resource to be allocated, resource allocation time and a resource share, wherein the leftover resource allocation schedule comprises, for each task of each process, information on a type of leftover resource to be allocated, leftover resource allocation time and a leftover resource share, wherein the information of the resource management system comprises:

a process request status comprising a set of newly requested processes and information associated with the newly requested processes; and a resource usage status that is information on a resource needed by each process.

5. The method of claim 4, wherein the resource usage status and the process request status are updated by reflecting the basic resource allocation schedule in the resource usage status and the process request status respectively.

6. A computer program, which is stored in a non-transitory computer-readable storage medium in a computer, for altruistic scheduling method based on reinforcement learning using external, internal and leftover scheduling agents, the computer program, executed by a processor of the computer, to perform:

determining, by using the external scheduling agent, a basic resource share for each process based on information of a resource management system;

determining, by using the internal scheduling agent, a basic resource allocation schedule for each process based on information comprising the basic resource share and a resource leftover based on the basic resource allocation schedule; and determining, by using the leftover scheduling agent, a leftover resource allocation schedule based on information comprising the resource leftover, wherein the internal scheduling agent performs learning by receiving feedback from the resource management system reflecting at least one of the basic resource allocation schedule and the leftover resource allocation schedule, and wherein the feedback comprises:

fairness evaluation on whether or not an opportunity to use a resource is equally provided to processes, evaluation of completion time that is a required time from the onset of a process to the end of execution, and efficiency evaluation based on the number of processes that are processed per unit time, wherein the leftover scheduling agent performs learning by receiving feedback from the resource management system reflecting the basic resource allocation schedule or the leftover resource allocation schedule, and wherein the feedback comprises the evaluation of completion time and the efficiency evaluation, wherein the external scheduling agent performs learning by receiving feedback, and wherein the feedback comprises the fairness evaluation, wherein the basic resource share comprises, for each process, information on a type of resource to be allocated, resource allocation time and a resource share, wherein the basic resource allocation schedule comprises, for each task of each process, information on a type of resource to be allocated, resource allocation time and a resource share, and wherein the information of the resource management system comprises:

a process request status comprising a set of newly requested processes and information associated with the newly requested processes; and a resource usage status that is information on a resource needed by each process.

* * * * *